United States Patent Office 3,071,606
Patented Jan. 1, 1963

3,071,606
MERCURY DERIVATIVES OF ACYLAMINO PHENOXYACETIC ACIDS
Bill Elpern, Walnut Creek, Calif., assignor to Sterling Drug Inc., New York, N.Y., a corporation of Delaware
No Drawing. Filed Nov. 7, 1960, Ser. No. 67,496
4 Claims. (Cl. 260—434)

This invention relates to compositions of matter known in the art of chemistry as organomercurials and to a process for making such compositions.

Organomercurials are known in the art in which the mercury atom is attached through one of its valences to aromatic groups as well as to aliphatic groups. It is also known to mercurate phenoxyacetic acid, whereby the mercury atom becomes attached to the phenyl nucleus.

In its composition aspect, the invention sought to be patented is described as residing in the concept of a molecular structure in which an anionomercuri radical, that is, a radical consisting of an anion joined to a mercury atom, is attached through a free valence of the mercury atom to the benzene nucleus of an acylaminophenoxyacetic acid, the anion consisting of a radical or group, for example, hydroxy, halide, carboxymethylmercapto and 1,2-dicarboxyethylmercapto, derived from an organic or inorganic acid by the removal of an acidic hydrogen ion.

In its process aspect, the invention sought to be patented is described as residing in the concept of reacting a mercuric salt, preferably a mercuric alkanoate, with an acylaminophenoxyacetic acid. If desired, the alkanoate anion of the resulting organomercurial product thus obtained may be replaced by another anion, e.g.,hydroxy, halide, carboxymethylmercapto and 1,2-dicarboxyethylmercapto. Mercuric acetate is the preferred mercurating agent, and the mercuration process can be carried out either in water or a suitable water miscible organic solvent, for example methanol or other lower alcohol.

Pharmacological evaluation of the compounds of the invention by standard test procedures indicates their utility as diuretics.

The novel compounds of the invention are especially useful in the form of their water-soluble salts, for example their alkali metal and ammonium salts, and they can be isolated as such or used directly as prepared in aqueous solution. Alternatively, the acid can be isolated and dissolved when needed in an aqueous solution containing an equivalent quantity of an alkali.

The intermediate acylaminophenoxyacetic acids can be prepared by reacting an appropriate acylaminophenol with a haloacetic acid in an aqueous solution containing an equivalent of an alkali metal hydroxide, for example sodium hydroxide and potassium hydroxide, at a temperature between about 20° C. and about 120° C.

The physical embodiments of the invention in the form of their alkali metal salts are white or yellow-white powders which are soluble in water and slightly soluble in methanol.

The foregoing is a general description of the manner and process for making and using the invention so as to enable any person skilled in the art of chemistry to make and use the same. The best mode contemplated by the inventor of carrying out his invention is presented in the following description:

Suspend one molecular equivalent of the acylaminophenoxyacetic acid in about eight times its weight of water and add about one molecular equivalent of aqueous sodium hydroxide solution until the resulting solution is just neutral. Filter the solution and to it slowly add, with stirring, a filtered solution of one molecular equivalent of mercuric acetate in about five times its weight of water containing about two molecular equivalents glacial acetic acid. Stir the mixture at about room temperature until a test for mercuric ion is negative (in the presence of mercuric ion, dilute sodium hydroxide produces a yellow precipitate of mercuric oxide). Collect the white to yellow precipitate which is the acetoxymercuri-substituted acylaminophenoxyacetic acid.

To prepare the hydroxymercuri-substituted acylaminophenoxyacetic acid from the above compound, dissolve the acetoxymercuri compound in excess dilute aqueous sodium hydroxide solution and precipitate the corresponding hydroxymercuri compound by adding excess glacial acetic acid.

To replace the anion associated with the free valence of the mercury atom with X, an anion other than alkanoate or hydroxyl, suspend one molecular equivalent of the hydroxymercuri compound described above in about five times its weight of methanol and add to it a solution containing one molecular equivalent of the appropriate acid, HX, and three molecular equivalents of an alkali metal hydroxide in the minimum quantity of about 50 percent aqueous methanol necessary for solution. Stir the solution for about three hours at room temperature, and then add about 55 molecular equivalents of ethanol. Cool the solution to about 0° C. and add an equal volume of isopropyl alcohol. An oil settles out which solidifies by triturating it with water-miscible organic solvents, for example isopropyl alcohol and acetone.

Using the procedure as described above, I prepared certain compounds of the invention for pharmacological testing. The following is representative of the process used and of the compounds which I prepared:

EXAMPLE I

*5-Acetamido-2-(Hydroxymercuri)Phenoxyacetic Acid*

Suspend 12.6 grams (0.06 mol.) of 3-acetamidophenoxyacetic acid in 100 ml. of water and add about five ml. of 35 percent aqueous sodium hydroxide solution until the resulting solution is just neutral. Then filter the solution and to it add, with stirring, a filtered solution of 19.1 grams (0.06 mole.) of mercuric acetate in 100 ml. of water containing 7.0 ml. of glacial acetic acid. Stir the mixture at room temperature until a test for mercuric ion is negative. Then collect the yellowish-white precipitate and dissolve it in a dilute aqueous solution of sodium hydroxide. The addition of acetic acid to the solution precipitates the 5-acetamido-2(hydroxymercuri)-phenoxyacetic acid as a cream colored powder which weighs 17.5 grams when dry. A sample of the 5-acetamido-2(hydroxymercuri)phenoxyacetic acid prepared in the above-described manner melted with decomposition at 232.7–236.1° C. (corr.) and gave the following results on analysis:

Anal.—Calcd. for $C_{10}H_{11}HgNO_5$: C, 28.21; H, 2.60; Hg, 47.11; N, 3.29. Found: C, 27.90; H, 2.62; Hg, 49.6; N, 3.11.

EXAMPLE II

*Trisodium 5-Acetamido-2(1,2-Dicarboxyethylmercaptomercuri)Phenoxyacetate Trihydrate*

Suspend 17.5 grams (0.04 mol.) of the compound described above in 65 ml. of methanol and to it add a solution containing 6.1 grams (0.04 mol.) of thiomalic acid and 4.9 grams (0.12 mol.) of sodium hydroxide in 65 ml. of water and 80 ml. of methanol. Stir the yellow solution for three hours at about room temperature and then add 130 ml. of ethanol. Cool the solution to about 0° C. and add 130 ml. of isopropyl alcohol. A yellow oil settles out which solidifies by triturating it with isopropyl alcohol and acetone. When dry, the trisodium 5-acetamido - 2(1,2 - dicarboxyethylmercaptomercuri)phenoxyacetate trihydrate prepared in this manner weighs 19.5 grams and decomposes at 241° C. (corr.)

The molecular structures of the compounds of the invention are determined by their mode of synthesis and by the correspondence of the calculated and found values of the elemental analyses of representative samples. Furthermore, it was observed that the hydroxymercuri compounds of the invention lose weight on drying at elevated temperatures due to the formation of an anhydride, by substitution, vicinal to the oxyacetic acid grouping, of the hydroxymercuri group. The size of the mercury atom precludes its insertion between the acetamido group and the oxyacetic acid group.

The diuretic activity of the compounds of the invention was tested by injecting solutions of the compounds subcutaneously into the upper hind-quarters of female unanesthetized dogs. The results of these tests show that the compounds have strong diuretic activity. The data in the following table show the diuretic response during a six hour period following administration of the compound given as Example II above:

ous modifications of the anion associated with the free valence of the mercury atom for example, hydroxy, halide, carboxyalkylmercapto, theophyllinyl and alkanoate will be obvious to those skilled in the art. It will also be obvious to those skilled in the art that alkali metal, alkaline earth, and ammonium salts (that is, salts prepared from ammonia, amines, and quaternary ammonium hydroxides) of the acid compounds of the invention can be utilized to increase the solubility of the compounds in water. These variants of the specific compounds shown above are regarded by the inventor as the full equivalents of the particular embodiments of the invention herein specifically described and claimed.

What I claim is:
1. 5-acetamido-2-(hydroxymercuri)phenoxyacetic acid.
2. Trisodium 5 - acetamido-2-(1,2-dicarboxyethylmercaptomercuri)phenoxyacetate.
3. A process for the preparation of 5-acetamido-2-(hydroxymercuri)phenoxyacetic acid which comprises reacting 3-acetamidophenoxyacetic acid with an equivalent of mercuric acetate and treating the resulting mercurial with an alkali and then acetic acid.

| Compound | Route of administration | Dose, mg. Hg/kg. | No. of dogs | Control | Mean Excretion of Urine in ml./kg./hr. | | | | | |
|---|---|---|---|---|---|---|---|---|---|---|
| | | | | | 1 | 2 | 3 | 4 | 5 | 6 |
| Example II | Subcutaneous | 1.50 | 5 | 0.60 | 0.42 | 0.77 | 6.07 | 12.73 | 8.30 | 5.86 |

The foregoing description of the best mode of carrying out the invention is for the purpose of illustration and is not intended to limit the generality of the applicability of the inventive concept as herein set forth. Other acylaminophenoxy acetic acids can be mercurated in the manner described above. That is, acylaminophenoxyacetic acids include not only isomeric modifications of the acylamino group on the positions of the benzene nucleus, but also modifications of the acyl group, for example, formyl, acetyl, propionyl, benzoyl and phenylacetyl. Vari- 4. In a process for the preparation of trisodium 5-acetamido - 2-(1,2-dicarboxyethylmercaptomercuri)phenoxyacetate the step which comprises treating 5-acetamido-2-(hydroxymercuri)phenoxyacetic acid with a solution containing the thiomalate anion.

References Cited in the file of this patent
UNITED STATES PATENTS

| | | |
|---|---|---|
| Re. 16,921 | Kharasch | Apr. 3, 1928 |
| 1,589,599 | Kharasch | June 22, 1926 |